Figure 1:
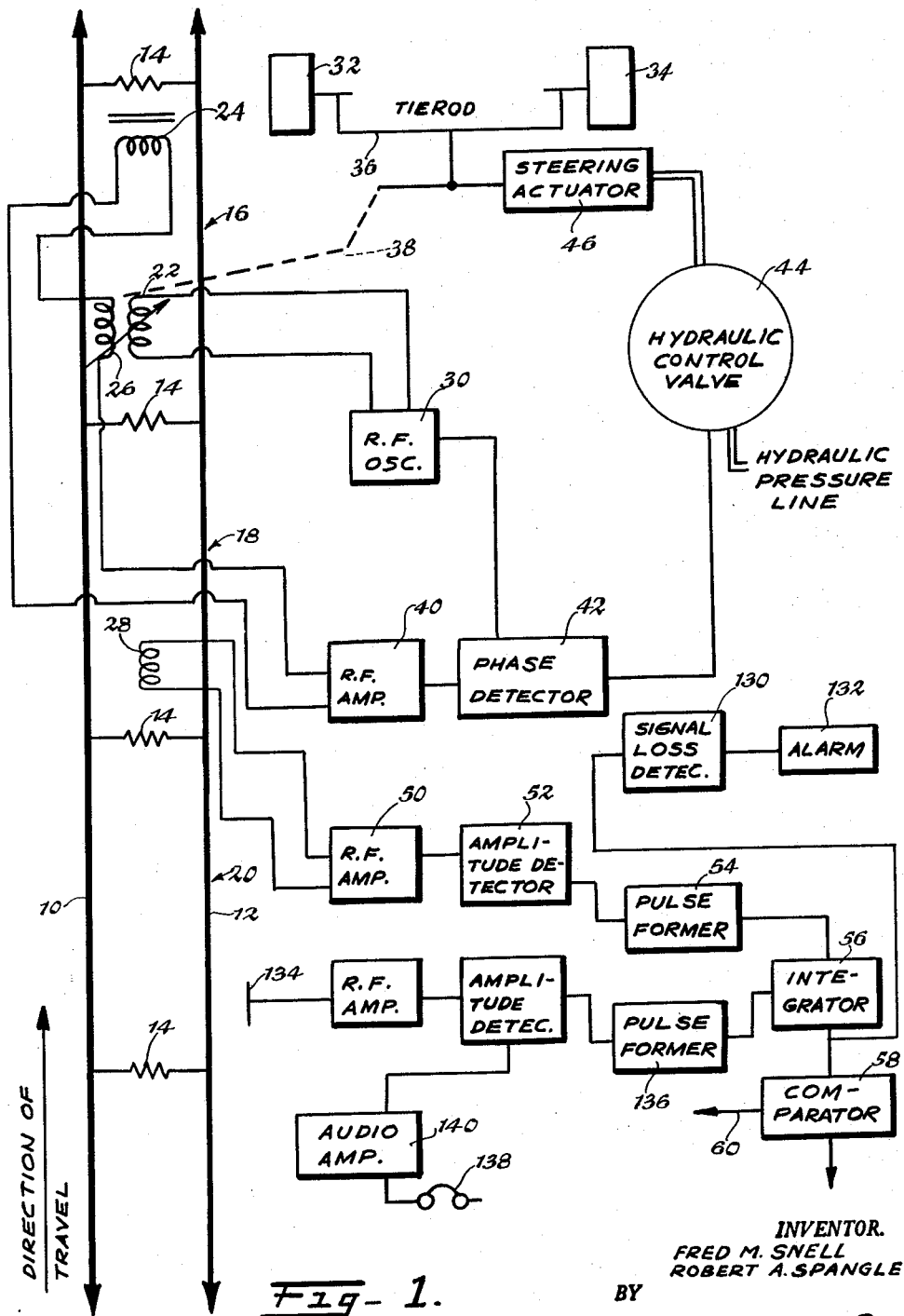

Sept. 22, 1964  F. M. SNELL ETAL  3,149,691
AUTOMOBILE GUIDANCE AND SPEED CONTROL SYSTEMS
Filed Aug. 4, 1961  2 Sheets-Sheet 1

INVENTOR.
FRED M. SNELL
ROBERT A. SPANGLER
BY
Bean, Brooks, Buckley & Bean
ATTORNEYS United States Patent Office 3,149,691
Patented Sept. 22, 1964

3,149,691
AUTOMOBILE GUIDANCE AND SPEED
CONTROL SYSTEMS
Fred M. Snell, 4090 Elma Road, Williamsville, N.Y., and
Robert A. Spangler, 3442 Main St., Buffalo, N.Y.
Filed Aug. 4, 1961, Ser. No. 129,407
17 Claims. (Cl. 180—82.1)

This invention relates to highway safety devices and is directed, more particularly, to a system for vehicular directional and velocity control.

Generally speaking, the present invention is concerned with a system as aforesaid wherein the highway-associated means is normally passive while the active components of the system are vehicle-carried. This relationship permits of highway installation of the system which is of minimum cost and, further, reduces the maintenance cost to negligible proportions. Still further, such a system isolates failure to the individual vehicle so affected and therefore obviates massive failure or breakdown such as would endanger all vehicles within the affected zone.

More particularly, an object of the present invention is to provide an electromagnetic system for the purpose described in which the highway system comprises a pair of parallel conductors bridged at predetermined points therealong so as to divide the system into a series of interconnected loops, and in which the vehicular system includes an R.F. exciter coil and a pair of pickup coils, the latter so oriented that one, controlling automatic steering of the vehicle, is sensitive to deviations laterally from a centered position between the parallel conductors and the other, connected to vehicle speed control mechanism, is sensitive to speed of passage over successive loops.

Another object of this invention is to provide derivative steering control in a vehicle guidance system, the derivative control being achieved by the physical displacement of coil means in conjunction with steering effect imparted to the vehicle.

More specifically, the above object may be realized in a system having a highway component in the form of a series of similar electromagnetic loops, in which the vehicle carried component includes an exciter coil for inducing an electromagnetic field in such loops as the vehicle proceeds along a highway, there being a pickup coil for sensing lateral deviations of the vehicle from a neutral position relative to the loop, and wherein the stated coil means consists of a derivative coil coupled to the exciter coil in series with the pickup coil, the derivative coil being movable as specified to vary its coupling with the exciter coil.

Alternatively, the above stated derivative steering control may take the form, in a system having a highway component dividing the highway into a series of similar electromagnetic loops and a vehicle component including an exciter coil for inducing an electromagnetic field in such loops, of a combined pickup and derivative coil null coupled to the exciter coil constituting the above stated coil means.

More specifically with regard to the preceding object, the present invention envisages a derivative steering control as aforesaid which is characterized by its independence of amplitude discrimination by virtue of the attainment of a control signal arising from a single, null-seeking coil.

Still another object of this invention resides in the provision of a vehicular control system according to the preceding object wherein the steering control coil is connected in series to a further coil directly coupled to the exciter coil but whose position is varied in accord with the deviation of the vehicle steering wheels from the straight ahead position, to thereby provide derivative control for the steering system.

Another object of this invention resides in the combination of a highway-associated system component and a vehicle-associated system component wherein the highway component is passive, the vehicle component including transmitting means and pickup or receiving means in which the highway component acts to relay transmitted signals to the pickup means, obviating the necessity for external intelligence to be imparted to the highway component.

A further object of this invention is to provide, in an assembly generally as described, a speed control system in which a D.C. level signal is produced as a function of vehicle speed, and wherein comparator means is connected to provide an output proportional to the difference between the instantaneous potential of the D.C. level signal and the optimum potential thereof, whereby to effect vehicular speed control correction.

Another object of this invention is to provide, in an assembly as aforesaid, a novel speed control system including means for producing a D.C. signal whose level is proportional to vehicle speed, and means for affecting vehicle speed in accord with such signal.

A further object of this invention resides in the provision of a novel chopper circuit.

Figure 2:
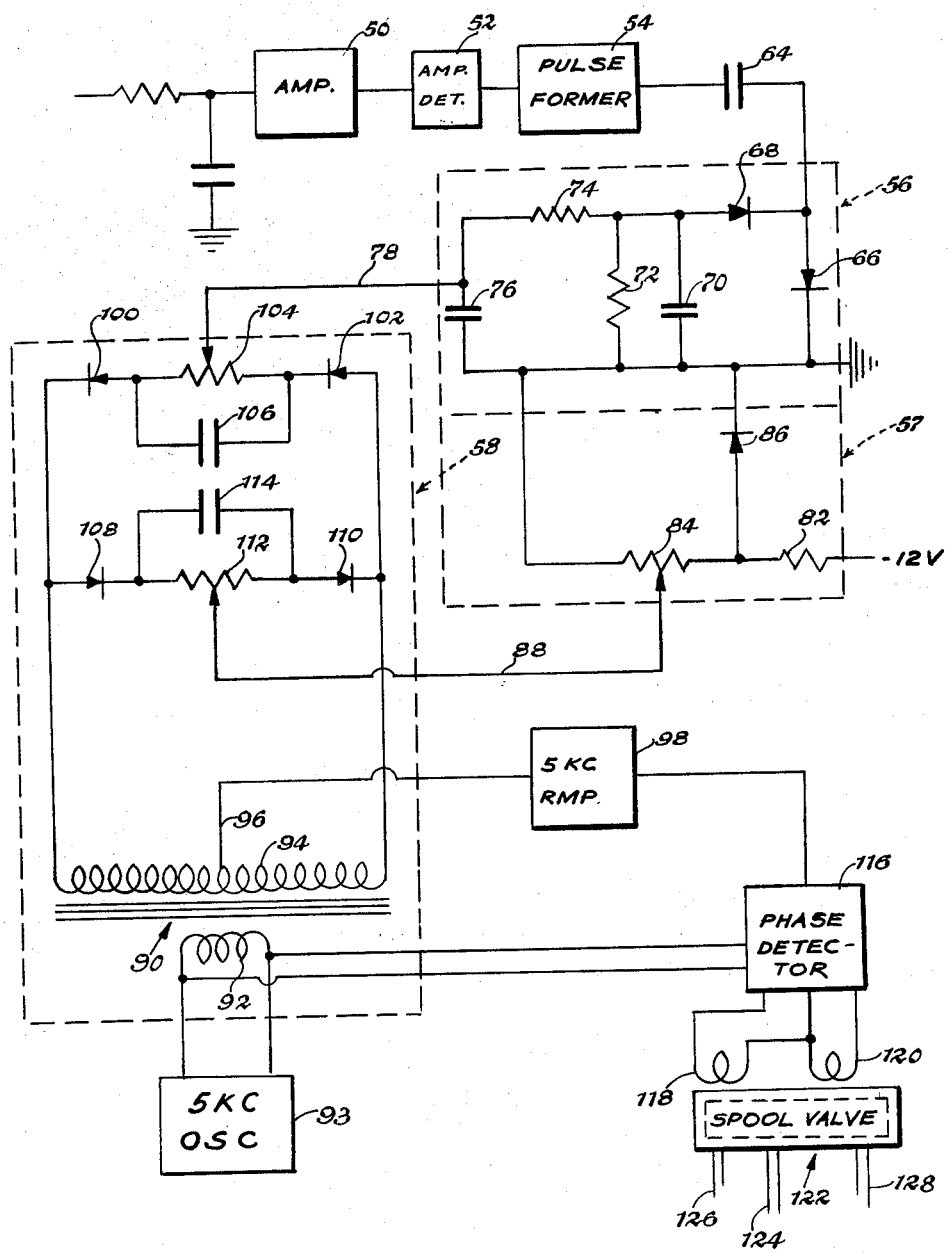

Other objects and advantages of the invention will appear from the description hereinbelow and the accompanying drawings wherein:

FIG. 1 is a diagrammatic view illustrating the components of the present system; and FIG. 2 is a partially schematic view illustrating a portion of the speed control system and including the novel chopper according to the invention.

Referring now more particularly to FIG. 1, the mechanism to be associated with the highway as shown therein comprises a pair of continuous conductors 10 and 12 bridged at spaced intervals to present a series of loops such as the loops 16, 18 and 20 shown. It is to be understood that one form of network system such as this could take the form of a pair of cables 10 and 12 spaced approximately nine inches apart and coupled together every twenty-four inches by the lengths of cable 14 having a given resistance. Such a network could be manufactured as a unit, say in strip form, and fastened to an existing highway by suitable adhesive material.

In any event, it is to be further understood that except for optional circumstances, hereinafter pointed out, the cable network is passive. That is, the desired control is achieved without imposing external power or intelligence upon the cable network.

For the purpose of avoiding the necessity for external intelligence, each vehicle is equipped with an exciter coil 22, a steering position detection coil 24, a steering derivative feedback coil 26 coupled directly with the exciter coil and a speed detection coil 28, all carried by the vehicle in predetermined relation to each other. Insofar as the coils 22 and 24 are concerned, they are so related as to render this part of the system sensitive to lateral position relative to the highway loop system. The coils 22 and 26, on the other hand, are so related as to render this part of the system sensitive to the periodicity with which the exciter coil crosses over from one loop to the next. For this purpose, the spacing between these coils 22 and 28 is chosen, relative to the length of the loops, so as to avoid deleterious harmonic effects and to permit of lessening the lengths of the loops in areas wherein it is desired to effect an automatic speed reduction. That is to say, for proper operation, the same cyclic relationship between coils and loops should not be altered even down to the lowest controlled speed. For example, using a standard loop length of twenty-four inches as specified, the spacing between the coils 22 and 28 is preferably about ten inches. In this manner, assuming a standard controlled speed of sixty miles per hour and a minimum controlled speed of thirty miles per hour, during standard control speed operation, the coils 22 and 28 would alternately bear the relationship of being in vertical registry over the same loop and, every time the exciter coil crosses over into registry above the next loop, the relationship of being in vertical registry over adjacent loops. At the minimum controlled speed, this same cyclic relationship would exist since the bridging members 14 would then be spaced apart by twelve inches (30 m.p.h.) and the spacing (10 inches) between coils 22 and 28 is less than the minimum spacing. It will be appreciated that other and different loop lengths may be employed, with corresponding preferred proportional spacing between coils as aforesaid.

The exciter coil 22 is connected to an R.F. oscillator 30 and is vertically oriented so as to induce a magnetic field in the corresponding highway loops 16, 18, etc. It will be appreciated that such field will be confined largely to the loop above which the exciter coil is registered, and will exist in adjacent loops in much attenuated degree.

Generally speaking, the highway loops as described above are operative to relay the signal from the exciter coil to the various receiver or pickup means, the vehicle control intelligence being derived from the instantaneous relationship between the highway-associated component of the system and the vehicle-associated component of the system, according to the mechanisms hereinbelow.

The steering position detection coil 24 is positioned with its axis horizontally oriented and normal to the direction of vehicle travel so that, when centered between the two conductors 10 and 12, the coil will receive no signal from the loops 16, etc. Whenever the vehicle moves laterally relative to the highway cable loop system, the coil 24 will deviate from the centered position and will pick up a signal from the loop system whose phase will be dependent upon the side to which deviation has occurred.

The derivative feedback coil 26 is connected in series with detection coil 24 and is coupled electromagnetically to the exciter coil 22. However, the position of coil 26 relative to the exciter coil 22 is varied in accord with the position of the front or steering wheels 32 and 34 of the vehicle having a null coupling position when the vehicle steering wheels are in neutral or straight ahead position. Therefore, for simplicity, the wheels 32 and 34, are shown connected simply by the tie rod 36 which is, in turn, directly connected as indicated by the dotted line 38 to suitable means for moving the coil 26. By varying the position of coil 26 as a function of steering direction, it will be evident that automatic damping of lateral acceleration is provided, thereby rendering the steering system more stable and less subject to "hunting." It will also be appreciated that any desired steering-responsive connection may be made, so long as derivative feedback is achieved.

The sum of the signals from coils 24 and 26 is passed to an R.F. amplifier 40 and this summed signal is demodulated by the phase detector 42, to which both the amplifier 40 and oscillator are coupled as shown. The signal from phase detector 42, whose polarity depends upon the phase of the detected signal, is fed to a suitable hydraulic control valve 44 which controls the steering actuator 46 according to the stated polarity, the actuator 46 being mechanically linked to the front wheels 32 and 34, as by connection to the tie rod 36. It is to be understood of course, that the system could be incorporated in an existing power steering arrangement, or as well, separate actuation of the steering mechanism may be employed.

Alternatively, the derivative steering control may be achieved directly from the pickup coil, thereby eliminating the coil 26 as shown in FIG. 1. In this case, the exciter coil and the pickup coil would be constructed as a module or unit. These coils would then be mechanically linked to the steering mechanism so as to be moved as a unit in association or appropriate register therewith. An outstanding advantage of this modification is the elimination of any dependence of the system upon amplitude discrimination since the signal arises from a single null-seeking coil.

The speed control pickup coil 28 is vertically oriented and is shielded from or so oriented with respect to the exciter coil 22 so that the coil 28 picks up signals only from the loop system. Since the field induced in the loop system will be of greatest magnitude in that loop over which the exciter coil 22 is registered, and will be attenuated in each successive loop, the amplitude of the signal picked up by the coil 28 will be at a maximum when both of the coils 22 and 28 are registered over the same loop and will be at a minimum when these coils are registered over different loops. This varying signal is fed to the amplifier 50 and the output of the amplifier is coupled to the demodulator 52 which is in turn connected to the pulse generator 54. Thus, the output of the pulse generator 54 will be at a frequency directly proportional to vehicle speed. In order to utilize this signal for speed control purposes, it is rectified and integrated to produce a D.C. level signal whose value is dependent upon the frequency of the pulse generator signal. For this purpose, the output of the pulse generator 54 is connected to the rectifier-integrator 56. This D.C. level signal is then compared, by the assembly 58, with a reference potential, as indicated at 60, and the output of comparator 58 is fed to means hereinafter described for controlling the speed of the vehicle.

Referring now to FIG. 2, it will be seen that the pulse generator 54 is coupled to the rectifier-integrator network 56 through blocking capacitor 64 and that the rectifier-integrator 56 includes a diode 66 which is connected to pass the positive going spikes of the pulses to ground and a diode 68 which is connected to pass the negative going spikes to the integrating circuit. The negative spikes are integrated by capacitor 70 which, together with the resistor 72, determines the time constant for the circuit. A filter comprising resistor 74 and associated capacitor 76 completes the network which is coupled at 78 to the comparator 58.

The reference potential circuit 57 comprises a voltage divider chain, consisting of resistor 82 connected to a source of potential and the potentiometer 84 grounded as shown, and the voltage regulating Zener diode 86 connected between the voltage divider chain to ground. By this arrangement of the Zener diode 86, it will be seen that the output at 88 will be stabilized to a fixed reference potential value independent of variation in the source, which reference potential may be varied by the potentiometer 84 so as to correspond to the desired control speed.

It will be appreciated that whereas a negative voltage source is shown specifically in FIG. 2, a positive source could as well be used, in which latter case the orientation of diodes 66, 68 and 86 would be reversed from that shown. The polarity of the voltage source would normally be dependent upon the polarity of the electrical system employed in the particular vehicle under consideration.

The diode chopper or comparator 58 comprises an audio transformer 90 whose primary 92 is connected to a suitable oscillator 93 and whose secondary 94 is provided with a center tap 96 connected to the amplifier 98. One branch of the diode chopper network comprises the diodes 100 and 102 and the intervening potentiometer 104, capacitor 106 being provided to bias the diodes, and the movable tap of the potentiometer 104 being connected to the output 78 of the network 56. The other branch of the diode chopper comprises the diodes 108 and 110 connected across the transformer secondary 94 in opposite fashion to the connection of diode 100 and 102 thereacross. Otherwise, this branch is similar to that previously described, including the potentiometer 112 and the bias capacitor 114. The movable tap of the potentiometer 112 is connected to reference potential at 88.

Diode Chopper Operation

The two branches as above described are so related that current will alternately flow, in opposite directions, therethrough. When current is flowing through the upper branch in FIG. 2, the output of rectifier-integrator 56 will be connected to the center tap 96 of transformer secondary 94 by a low impedance pass and, when current is flowing through the lower branch, the reference potential at 88 will be connected to the center tap 96 of transformer secondary 94 by a low impedance pass. Thus, the assembly operates as a chopper at the audio frequency and the output is a signal whose amplitude and phase are dependent upon the magnitude and polarity of the effective difference in potential between outputs 78 and 88.

The signal at the center tap 96 is fed, as set forth above, to the amplifier 98 and then to the phase-sensitive detector 116 to which the oscillator 93 is also connected, as shown. The speed at which the system is set is controlled by the potentiometer 84 and when the D.C. level at output 78 corresponds to such setting, no signal will be present at the output of detector 116. On either side of this null point, however, a signal output is produced by detector 116 which may be used to control the throttle of the vehicle. This may be accomplished for example, by coupling the detector to two coils 118 and 120, the energization of which is alternative depending upon which side of the null point the signal at 96 appears. These coils selectively operate a spool valve 122 having a common connection 124 to the vehicle engine intake manifold, and connections 126 and 128 respectively connected to servo mechanism for opening and closing the engine throttle. Due in particular to the mechanical simplicity of such system, its use is preferred, since it is desirable to provide some form of vehicle acceleration limit, which function is automatically achieved by the use of manifold pressure.

An alarm may be incorporated in the speed control system, see particularly FIG. 1. For this purpose, the D.C. level output of rectifier-integrator 56 may be coupled to a signal loss detector 130 controlling the audible alarm mechanism 132. When no signal is detected by the coil 28, the alarm is operated. It is to be understood that additional safety mechanism, forming per se no part of this invention, would be employed. For example, suitable switch means to deactivate the speed control system is preferred, acting in conjunction with the alarm 132. Similarly, it is preferred that means be provided for deactivating the speed control system at the will of the vehicle operator. To this end, switch means responsive to either or both depression of the brake pedal or momentary depression and subsequent release of the accelerator pedal is preferred.

Optionally, the highway cable system may be rendered active under certain conditions. For example, in emergency areas where a temporary speed reduction is required, the intelligence in the form of a sequence of pulses may be imposed on the cable system at a carrier frequency different from the frequency of oscillator 30. The vehicular system then includes a capacitor pickup 134 for such signals which is ultimately coupled to the integrator 56 to provide additional pulses to the normal speed responsive system. In permanent areas of speed moderation, the lengths of the loops and consequently the spacing between adjacent bridging elements 14 may simply be lessened. The external intelligence may also take the form of voice communication, in which case the vehicular system would also include an audio system such as the speaker or headset 138 and audio amplifier.

It is to be understood that certain changes and modifications as illustrated and described may be made without departing from the spirit of the invention or the scope of the following claims.

We claim:

1. Apparatus for automatically controlling a vehicle traveling along a highway, the apparatus including highway associated means comprising a network for dividing the highway into a series of similar conductive loops, an exciter coil and a pickup coil disposed in fixed relation on the vehicle, an oscillator connected to said exciter coil whereby the pickup coil receives, from said loops, a signal of varying amplitude as the exciter coil passes from a position of vertical registry over a given loop into a position of vertical registry over a succeeding loop, pulse generating means connected to said pickup coil for generating a signal whose pulse frequency is proportional to vehicle speed, and means connected to said pulse generating means for controlling the speed of an associated vehicle.

2. Apparatus for automatically controlling a vehicle traveling along a highway, the apparatus including highway associated means comprising a network for dividing the highway into a series of similar conductive loops, an exciter coil and a pickup coil disposed in fixed relation on the vehicle, an oscillator connected to said exciter coil, said coils being disposed in longitudinally spaced relation whereby the pickup coil receives, from said loops, a signal of varying amplitude as the exciter coil passes from a position of vertical registry over a given loop into a position of vertical registry over a succeeding loop, pulse generating means connected to said pickup coil for generating a signal whose pulse frequency is proportional to vehicle speed, means for integrating the pulse signal to produce a D.C. level signal having a value proportional to the frequency of the pulse signal, a source of D.C. reference potential, and means for comparing said D.C. level signal and said reference potential to control the speed of an associated vehicle.

3. Apparatus for automatically controlling a vehicle traveling along a highway, the apparatus including highway associated means comprising a network for dividing the highway into a series of similar conductive loops, an exciter coil and a pickup coil disposed in fixed relation on the vehicle, an oscillator connected to said exciter coil, said coils being disposed in longitudinally spaced relation whereby the pickup coil receives, from said loops, a signal of varying amplitude as the exciter coil passes from a position of vertical registry over a given loop into a position of vertical registry over a succeeding loop, pulse generating means connected to said pickup coil for generating a signal whose pulse frequency is proportional to vehicle speed, means for integrating the pulse signal to produce a D.C. level signal having a value proportional to the frequency of the pulse signal, a source of D.C. reference potential, a comparator for connection to said reference potential and to the integrating means having an output proportional to the difference between the instantaneous potential of said D.C. level signal and the optimum speed-controlled potential thereof, and means connected to the output of said comparator for controlling the speed of the vehicle.

4. In the system according to claim 3 wherein said comparator comprises a chopper for comparing the output of said comparator and said D.C. level signal.

5. Apparatus for automatically controlling a vehicle traveling along a highway, the apparatus including energy transmitting means and energy pickup means mounted on the vehicle, and means disposed along the length of the highway dividing the same into a series of similar zones for successively directing energy received thereby from said transmitting means to said pickup means as a vehicle moves thereover, the last means comprising a pair of parallel conductors and conductor means bridging said conductors at regular intervals therealong to form said zones therebetween.

6. Apparatus for automatically guiding a dirigible vehicle along a roadway, the apparatus including a closed loop of conductive material disposed in the roadway such that a portion of the loop defines a desired path of vehicle travel, a signal transmitter mounted on the vehicle and inductively coupled to the closed loop when the vehicle is in proximity thereto, whereby the loop radiates an electromagnetic field above the roadway, a pickup mounted on the vehicle so as to be normally disposed in the electromagnetic field and responsive thereto to produce a guidance signal related to the deviation of the vehicle from the desired path, and servo means connected to the pickup and to the vehicle steering system and responsive to the guidance signal to maintain the vehicle in the desired path.

7. Apparatus for controlling a vehicle along a roadway, including a closed loop of conductive material disposed in the roadway along a desired path of vehicle travel, a signal transmitter mounted on the vehicle and coupled in energy transfer relation to the closed loop, whereby the energy transferred to the loop causes the loop to radiate an electromagnetic field above the roadway, and a pickup mounted on the vehicle so as to be normally disposed in the electromagnetic field whereby a control signal is induced in the pickup which is related to the disposition of the vehicle with respect to the desired path.

8. Apparatus for automatically controlling a vehicle traveling along a highway, the apparatus including a highway-associated component and a vehicle-carried component, characterized by the passivity of the highway-associated component, said highway-associated component comprising means dividing a highway along its length into a series of similar conductive loops defining a desired path of vehicle travel, said vehicle-carried component including a signal transmitter inductively coupled to said loops whereby the loops successively radiate an electromagnetic field, vehicle steering control pickup means and vehicle speed control pickup means normally disposed in the electromagnetic field and responsive thereto to produce respectively (a) a guidance signal related to the deviation of the steering control pickup means from the desired path and (b) a speed control signal related to the velocity of travel of the speed control pickup means along the desired path, first servo means connected to the steering control pickup means and responsive to the guidance signal for maintaining the vehicle in the desired path, and second servo means connected to the speed control pickup means and responsive to the speed control signal for maintaining the vehicle at a predetermined velocity along the desired path.

9. Apparatus for automatically controlling a vehicle traveling along a highway, the apparatus including a highway-associated component and a vehicle-carried component, characterized by the passivity of the highway-associated component, said highway-associated component comprising means dividing a highway along its length into a series of similar energy-relaying zones defining a desired path of vehicle travel, said vehicle-carried component including energy transmitting means inductively coupled to one of said zones when in proximity thereto, whereby the zones successively radiate an electromagnetic field, and vehicle steering control energy pickup means normally disposed in the electromagnetic field to produce a guidance signal related to deviation of a vehicle from the desired path.

10. Apparatus for automatically controlling a vehicle traveling along a highway, the apparatus including a highway-associated component and a vehicle-carried component, characterized by the passivity of the highway-associated component, said highway-associated component comprising means dividing a highway along its length into a series of similar energy-relaying zones defining a desired path of vehicle travel, said vehicle-carried component including energy transmitting means inductively coupled to one of said zones when in proximity thereto, whereby the zones successively radiate an electromagnetic field, and vehicle speed control energy pickup means normally disposed in the electromagnetic field to produce a speed control signal related to the speed of a vehicle along the desired path.

11. Apparatus for automatically controlling a vehicle traveling along a highway, the apparatus including a highway-associated component and a vehicle-carried component, characterized by the passivity of the highway-associated component, said highway-associated component comprising means dividing a highway along its length into a series of similar energy-relaying zones defining a desired path of vehicle travel, said vehicle-carried component including energy transmitting means inductively coupled to one of said zones when in proximity thereto, whereby the zones successively radiate an electromagnetic field, and vehicle steering control energy pickup means normally disposed in the electromagnetic field to produce a guidance signal related to deviation of a vehicle from the desired path, said steering control means including a derivative control coil coupled to said transmitting means in accord with steering movements imparted to an associated vehicle.

12. Apparatus for automatically controlling a vehicle traveling along a highway, the apparatus including a highway-associated component and a vehicle-carried component, characterized by the passivity of the highway-associated component, said highway-associated component comprising means dividing a highway along its length into a series of similar energy-relaying zones defining a desired path of vehicle travel, said vehicle-carried component including energy transmitting means inductively coupled to one of said zones when in proximity thereto, whereby the zones successively radiate an electromagnetic field, and vehicle steering control energy pickup means normally disposed in the electromagnetic field to produce a guidance signal related to deviation of a vehicle from the desired path, said transmitting means comprising an exciter coil and an oscillator connected thereto, said steering control means comprising a pickup coil mounted adjacent said exciter coil in null coupled relation thereto.

13. Apparatus for automatically controlling a vehicle traveling along a roadway and having an engine provided with speed control means, the apparatus including a plurality of successive closed loops of conductive material disposed in the roadway such that the loops define a path of vehicle travel, said loops being of predetermined lengths corresponding to desired vehicular speed, a signal transmitter mounted on the vehicle and inductively coupled to an underlying loop, whereby the loops successively radiate an electromagnetic field above the roadway as the vehicle travels along the path, a pickup mounted on the vehicle in longitudinally spaced relation to said signal transmitter which is less than the minimum length of said loops so as to produce a speed control signal related to the lengths of successive loops, and means connected to the pickup and to the speed control means and responsive to the speed control signal to maintain the vehicle at the desired speed.

14. Apparatus for automatically controlling a vehicle traveling along a highway, the apparatus including highway associated means comprising a network for dividing the highway into a series of similar conductive loops, an exciter coil and a pickup coil disposed in fixed relation on the vehicle, an oscillator connected to said exciter coil, said exciter coil being coupled in energy transfer relation to said highway associated means whereby energy transferred to said loops causes the loops to radiate an electromagnetic field above the highway, said pickup coil being mounted on the vehicle so as to be normally disposed in the electromagnetic field and being disposed in horizontally transverse position on the vehicle for affecting the phase of signals received from said highyway associated means in response to lateral disposition to either side of a centered position relative to said loops, and phase-sensitive means connected to said oscillator and said pickup coil for controlling the steering mechanism of the associated vehicle.

15. Apparatus for automatically controlling a vehicle traveling along a highway, the apparatus including highway associated means comprising a network for dividing the highway into a series of similar conductive loops, and exciter coil and a pickup coil disposed in fixed relation on the vehicle, an oscillator connected to said exciter coil, said exciter coil being coupled in energy transfer relation to said highway associated means whereby energy transferred to said loops causes the loops to radiate an electromagnetic field above the highway, said pickup coil being mounted on the vehicle so as to be normally disposed in the electromagnetic field and being disposed in horizontally transverse position on the vehicle for affecting the phase of signals received from said highway associated means in response to lateral disposition to either side of a centered position relative to said loops, and phase-sensitive means connected to said oscillator and said pickup coil for controlling the steering mechanism of the associated vehicle, a derivative control coil connected to said pickup coil and directly coupled to said exciter coil, and means for varying the coupling of the control coil to the exciter coil as a function of vehicle steering.

16. Apparatus according to claim 14 wherein said exciter coil is disposed with its axis vertical and said pickup coil is fixed closely adjacent the exciter coil in null coupled relation thereto.

17. Apparatus according to claim 16 including means for laterally displacing the exciter coil and the pickup coil as a function of vehicle steering.

References Cited in the file of this patent

UNITED STATES PATENTS

| | | |
|---|---|---|
| 2,488,815 | Hailes | Nov. 22, 1949 |
| 2,493,755 | Ferrill | Jan. 10, 1950 |
| 2,537,298 | Baughman | Jan. 9, 1951 |
| 2,661,070 | Ferrill | Dec. 1, 1953 |
| 2,716,186 | Ford | Aug. 23, 1955 |
| 2,842,039 | Swingle | July 8, 1958 |
| 2,847,080 | Zworykin et al. | Aug. 12, 1958 |
| 2,996,137 | Chu et al. | Aug. 15, 1961 |
| 3,008,532 | Reed | Nov. 14, 1961 |
| 3,015,741 | Richards | Jan. 2, 1962 |
| 3,018,367 | Mountjoy | Jan. 23, 1962 |
| 3,024,370 | Cohen | Mar. 6, 1962 |